(12) United States Patent
Aruga

(10) Patent No.: US 8,292,387 B2
(45) Date of Patent: Oct. 23, 2012

(54) IMAGE RECORDING DEVICE AND IMAGE RECORDING METHOD

(75) Inventor: Toshinao Aruga, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 399 days.

(21) Appl. No.: 12/628,681

(22) Filed: Dec. 1, 2009

(65) Prior Publication Data

US 2010/0141701 A1    Jun. 10, 2010

(30) Foreign Application Priority Data

Dec. 4, 2008   (JP) ................................ 2008-310005

(51) Int. Cl.
  *B41J 29/38*   (2006.01)
(52) U.S. Cl. .................. 347/9; 347/10; 347/11; 347/16
(58) Field of Classification Search .................. 347/9–16
  See application file for complete search history.

(56) References Cited

U.S. PATENT DOCUMENTS

2002/0126165 A1 *   9/2002   Adkins et al. ..................... 347/9

FOREIGN PATENT DOCUMENTS

JP    2006-327099 A    12/2006
JP    2008-068603 A    3/2008

* cited by examiner

*Primary Examiner* — Jason Uhlenhake

(74) *Attorney, Agent, or Firm* — Holtz, Holtz, Goodman & Chick, PC

(57) ABSTRACT

A control unit sets a head drive shortest cycle depending on a print mode, measures an encoder signal cycle, determines whether or not a measured encoder signal cycle is shorter than a head drive shortest cycle set in advance, switches a record synchronization signal to the head drive shortest cycle when it is determined that the measured encoder signal cycle is shorter (in YES), in No, corrects the position of superposed color dots and aligns record dots by a downstream recording unit to a dot position shift by an upstream recording unit when it is determined that the measured encoder signal cycle is longer (in NO), calculates and stores an amount of shift from an equal interval reference position by shifts of the head record synchronization signal and the measured encoder signal, and records an image in synchronization with a corrected record synchronization signal.

8 Claims, 9 Drawing Sheets

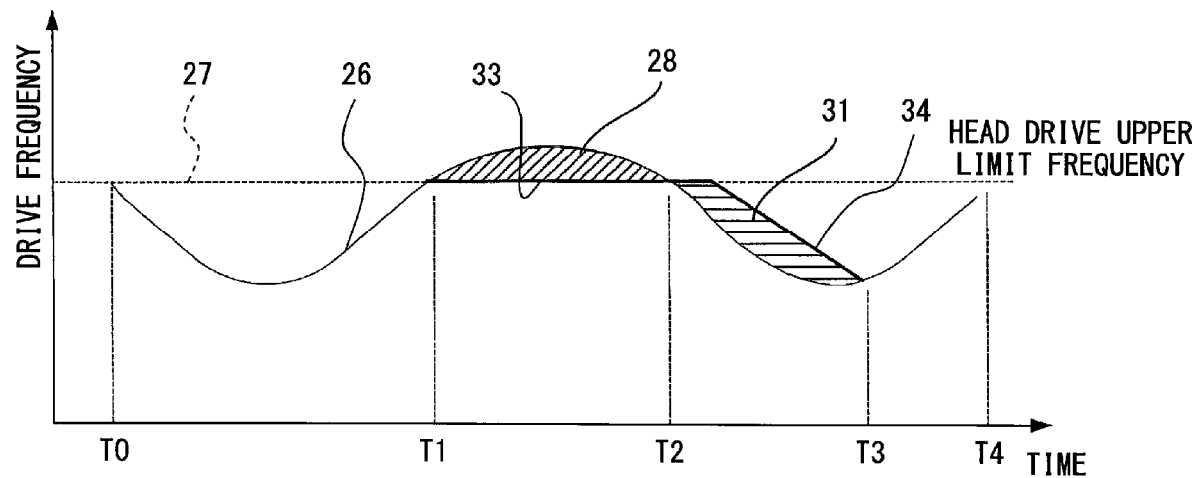
F I G. 4 A
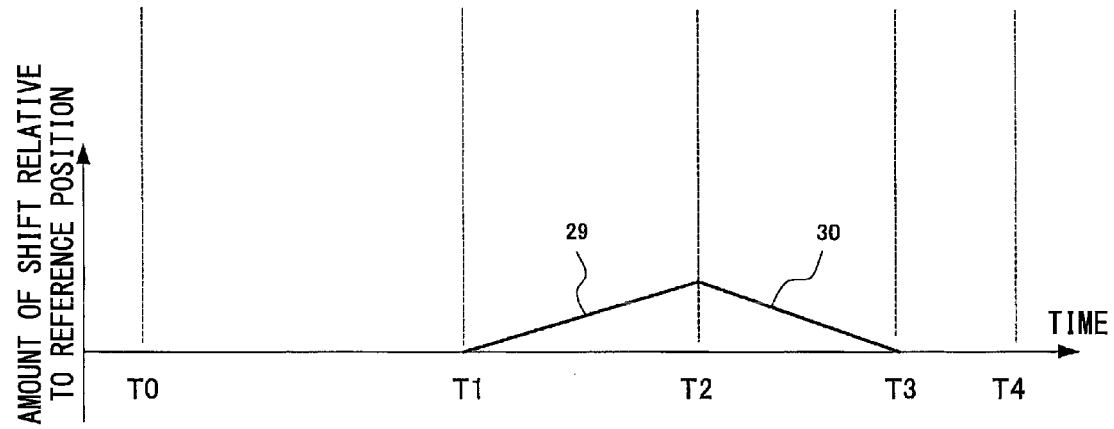
F I G. 4 B

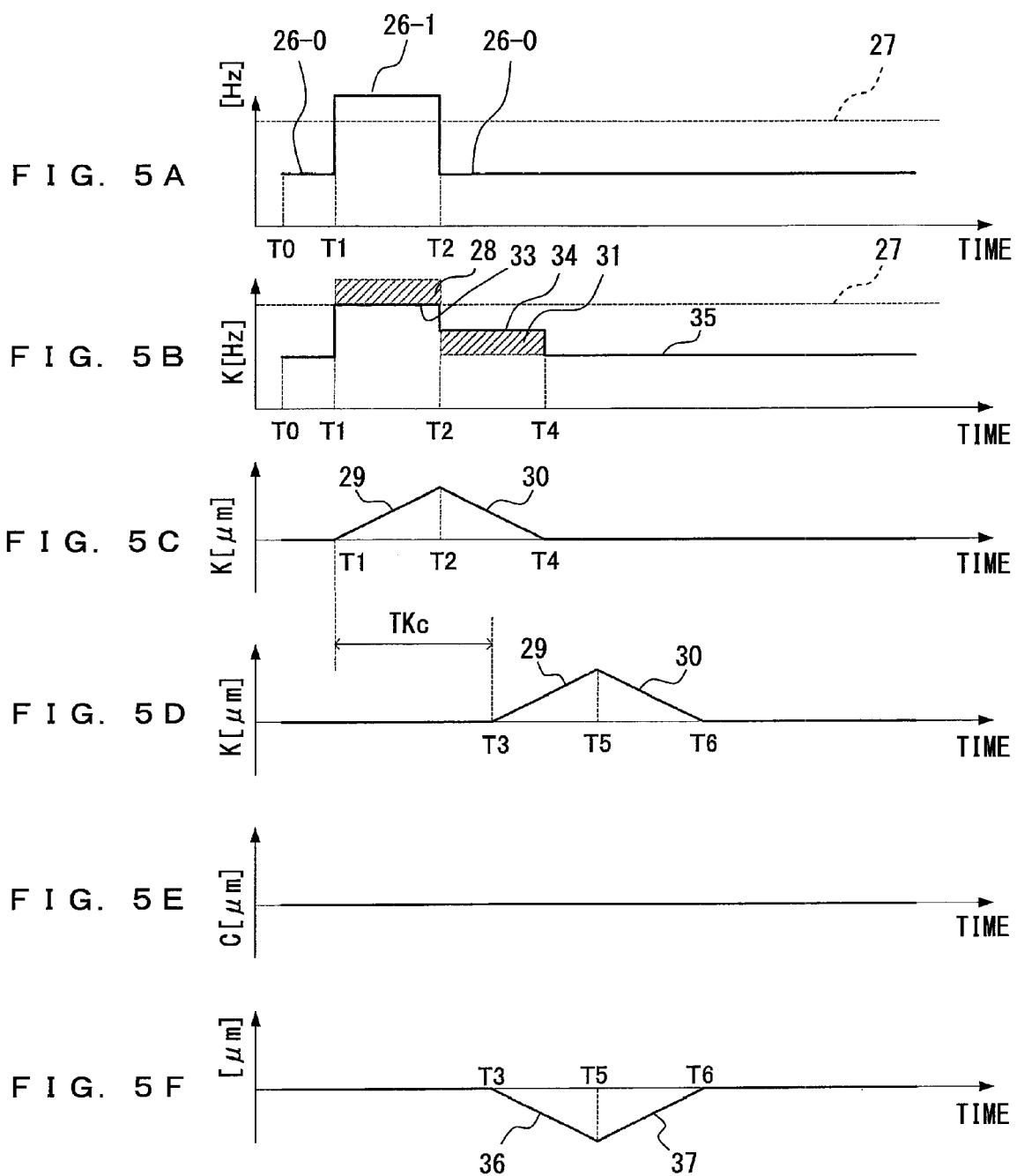

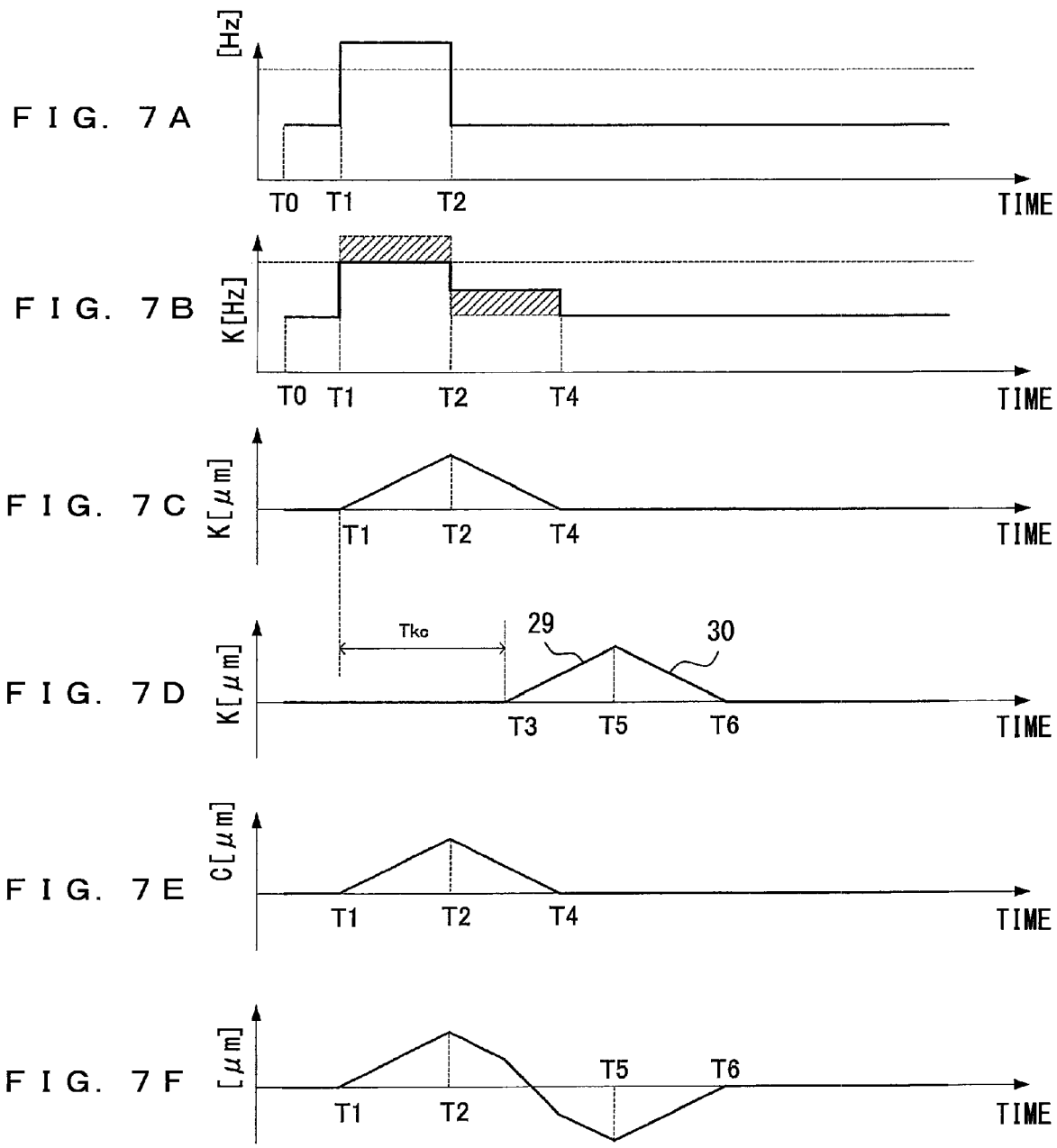

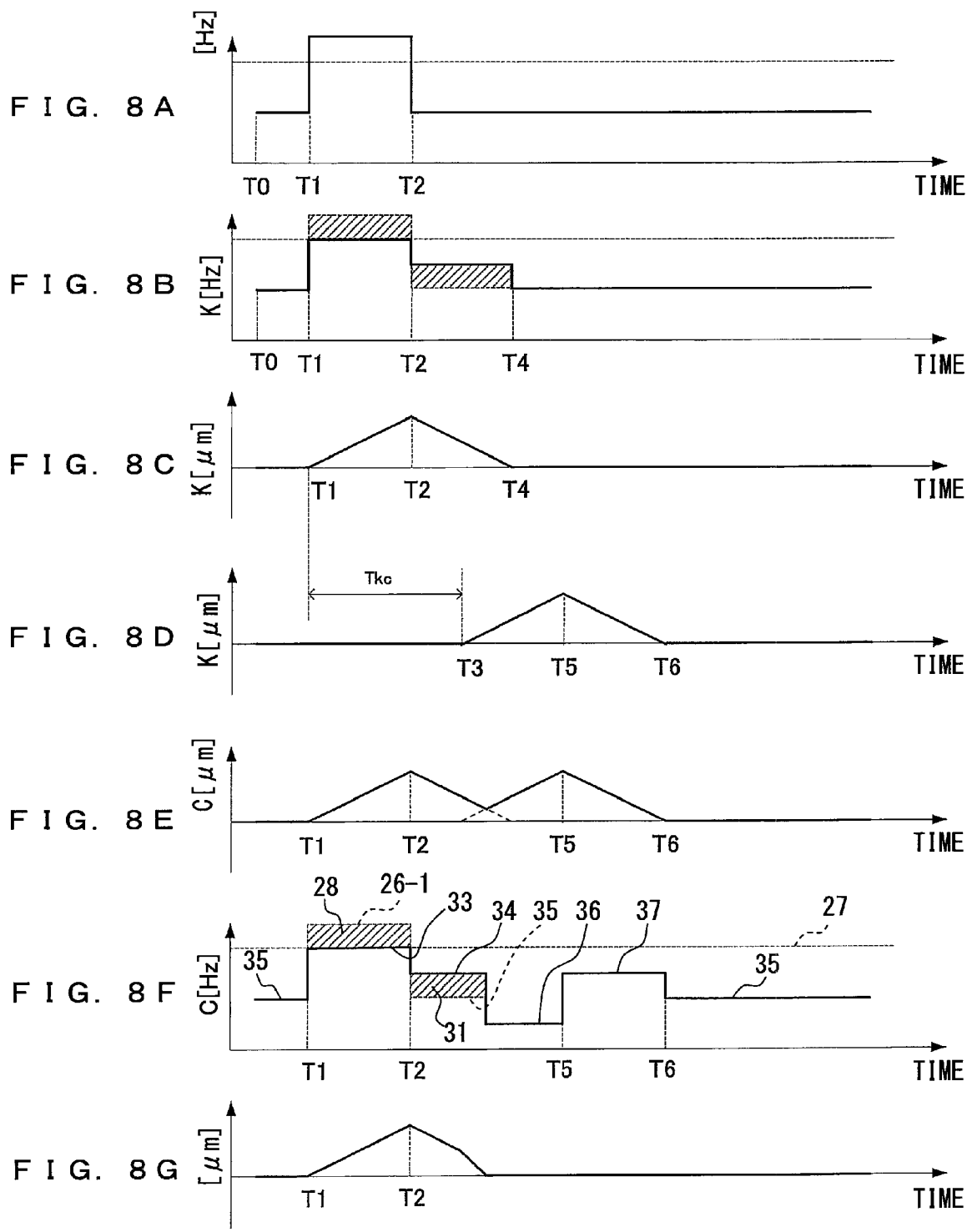

IMAGE RECORDING DEVICE AND IMAGE RECORDING METHOD

CROSS REFERENCE TO RELATED APPLICATION

This application is based upon and claims the benefit of priority from the prior Japanese Application No. 2008-310005, filed Dec. 4, 2008, the entire contents of which are incorporated herein by reference.

BACKGROUND OF THE INVENTION

1. Field of the Invention

The present invention relates to an image recording device and an image recording method for use in performing a recording process by discharging ink to a record medium after discharging ink from a plurality of line heads on the basis of encoder output depending on the conveyance a record medium and correctly superposing each image.

2. Description of the Related Art

Conventionally, for example, a full line image recording device in an inkjet system is well known as an image recording device for recording image (including characters) on a record medium such as a paper sheet etc. The full line image recording device is provided with line heads formed to have a length equal to the width of a record medium in a direction (main scanning direction) orthogonal to the direction of conveyance (sub scanning direction) in which the record medium is conveyed.

The line head is provided with a long nozzle array having a plurality of nozzles for discharging ink drops and arranged for each color of discharged ink. The line head for each ink color is arranged at a predetermined interval in the sub scanning direction with the ink discharge surface of the nozzles facing the record medium.

With the image recording device, a recording process can be performed on the entire surface of the record medium only by relatively moving the record medium and the line head having the nozzle array in the direction substantially orthogonal to the array direction of the nozzles.

Therefore, with the above-mentioned image recording device, the recording process can be quickly performed by a simple operation of not moving a carriage for holding a short recording head and not performing intermittent conveyance etc. of a record medium as with a serial image recording device.

However, on the other hand, the line head is more costly, has a lower yield, has lower reliability, etc. than the short recording head. An image recording device for solving these problems is provided with a line head having a long discharge nozzle array as a whole by arranging a plurality of short nozzle arrays in staggered form in a direction of the extension of the nozzle array.

The above-mentioned line head has the merits of a short nozzle array that excels in cost, yield, and reliability, and also has the merits of a line head. A well known image recording device as an example of the image recording device records an image according to an encoder signal output depending on a relative movement in the sub scanning direction to improve the record precision.

Furthermore, there is an image recording device proposed as having the function of not stopping an image recording process although the pulse cycle of an encoder output signal fluctuates by the speed variations of relative scanning, dirty scale or sensor configuring an encoder, etc.

For example, the Japanese Laid-open Patent Publication No. 2006-327099 describes the technology of transferring print data to a recording head according to an encoder signal output depending on the movement of a carriage provided with a short recording head in the main scanning direction.

The document discloses an image recording device provided with a device for holding information about the printing position of print data not transferred yet to perform a re-printing operation when the transfer of print data to a recording head is not completed in a predetermined transfer period.

In the Japanese Laid-open Patent Publication No. 2006-327099, the image recording device performs a re-printing operation when the print data is not completely transferred to the recording head within a predetermined transfer period. Since the device is provided with a unit for holding the information about the printing position of the print data for which transfer has not been completed, the re-printing operation can be performed in the next scanning process if the data transfer has not been completed.

In addition, the Japanese Laid-open Patent Publication No. 2008-68603 describes an image recording device having an encoder provided with slits at predetermined intervals, an encoder sensor for detecting the slits, and a control device for controlling the operation of recording an image depending on the pulse output from the encoder sensor.

The document discloses the image recording device including a measuring device for measuring the cycle of the output pulse of the encoder sensor, and a correction device for correcting the operation timing of the control device when he measured pulse cycle exceeds a predetermined range.

In the Japanese Laid-open Patent Publication No. 2008-68603, the operation timing or the output timing of a discharge trigger signal is delayed when the cycle of an encoder pulse is shorter than a predetermined value. Therefore, although the cycle of an encoder pulse is fluctuated by a dirty encoder scale, it hardly affects the operation timing of discharge etc., thereby maintaining high quality printing.

The above-mentioned image recording device provided with a line head, a record medium can be conveyed at a high speed of up to 1000 mm/s for recording. In this case, since there occurs a large load fluctuation especially in conveying a cut paper sheet, speed variations easily occur during the conveyance of a record medium.

Especially when the conveying speed changes for a higher speed, the cycle of an encoder signal as a reference of head drive becomes short. In this case, data transfer may not be completed for a recording head within a predetermined time or a faulty ink discharge may occur on the nozzles.

If the recording operation is performed by replacing the input encoder signal cycle with a longer drive cycle to avoid the above-mentioned problems when the conveying speed of a record medium is changed for a higher speed, a recorded image can be recorded after shifted behind in the direction of conveyance of the record medium.

Especially on an image recording device provided with a plurality of line heads for a plurality of colors in the direction of conveyance, the recording operation is performed on the record medium after shifted behind in the direction of conveyance at different position for the respective colors. Therefore, there occurs a dot position shift for each color for superposed printing, thereby causing undesired color variations.

If the average conveying speed of a record medium is sufficiently delayed as compared with the speed fluctuation (speed variations), there occurs no fluctuation to a higher speed. As a result, the problems that the data transfer to the recording head cannot be completed and that faulty discharge of the head occurs can be avoided. However, if the range of the sufficient delay for the speed fluctuation (speed variations) is too large, the throughput of the recording process can be degraded.

SUMMARY OF THE INVENTION

The image recording device according to the present invention has a conveyance mechanism for generating conveyance information about a record medium when the record medium is conveyed after received upstream from a conveyance path, and a plurality of recording units, each of which is provided with at least one nozzle array formed by a plurality of nozzles in the direction orthogonal to the direction of conveyance of the record medium, at predetermined intervals in a direction of conveyance so as to discharge ink by driving the plurality of nozzles of each recording unit, thereby performing a recording process on the record medium. The device includes at least: an encoder signal cycle measuring device for measuring an encoder signal cycle as the conveyance information about the record medium; a first nozzle drive cycle replacement device for replacing a nozzle drive cycle with a set cycle when the encoder signal cycle measured by the encoder signal cycle measuring device is shorter than the predetermined set cycle; a second nozzle drive cycle replacement device for replacing a predetermined period of the nozzle drive cycle with an optimum cycle between the set cycle and the measured encoder signal cycle when the encoder signal cycle measured by the encoder signal cycle measuring device changes from a point at which the cycle is shorter than the predetermined set cycle to a point at which the cycle is longer than the predetermined set cycle; and a third nozzle drive cycle replacement device for controlling the timing of the discharge drive of the nozzle arrays subordinate to the recording unit downstream in the direction of conveyance depending on the image position recorded by the nozzle arrays subordinate to the recording unit upstream in the direction of conveyance of the record medium.

The image recording method according to the present invention has a conveyance mechanism for generating conveyance information about a record medium when the record medium is conveyed after received upstream from a conveyance path, and a plurality of recording units, each of which is provided with at least one nozzle array formed by a plurality of nozzles in the direction orthogonal to the direction of conveyance of the record medium, at predetermined intervals in a direction of conveyance so as to discharge ink by driving the plurality of nozzles of each recording unit, thereby performing a recording process on the record medium. The device includes at least: an encoder signal cycle measuring step of measuring an encoder signal cycle as the conveyance information about the record medium; a first nozzle drive cycle replacement step of replacing a nozzle drive cycle with a set cycle when the encoder signal cycle measured in the encoder signal cycle measuring step is shorter than the predetermined set cycle; a second nozzle drive cycle replacing step of replacing a predetermined period of the nozzle drive cycle with an optimum cycle between the set cycle and the measured encoder signal cycle when the encoder signal cycle measured in the encoder signal cycle measuring step changes from a point at which the cycle is shorter than the predetermined set cycle to a point at which the cycle is longer than the predetermined set cycle; and a third nozzle drive cycle replacing step of controlling the timing of the discharge drive of the nozzle arrays by the recording unit downstream in the direction of conveyance depending on the image position recorded by the nozzle arrays of the recording unit upstream in the direction of conveyance of the record medium.

BRIEF DESCRIPTION OF DRAWINGS

FIG. 4A is an explanatory view (1) of correcting the upper limit of the head drive frequency of a record synchronization pulse signal in the nozzle array control unit of the image recording device according to the first embodiment;

FIG. 4B is an explanatory view (2) of correcting the upper limit of the head drive frequency of a record synchronization pulse signal in the nozzle array control unit of the image recording device according to the first embodiment;

FIG. 5A is a timing chart (1) of the operation when an arrangement correction of a superposed color dot is not made to a dot position shift of a reference color in the operation of each component of the image recording device according to the first embodiment;

FIG. 5B is a timing chart (2) of the operation when an arrangement correction of a superposed color dot is not made to a dot position shift of a reference color in the operation of each component of the image recording device according to the first embodiment;

FIG. 5C is a timing chart (3) of the operation when an arrangement correction of a superposed color dot is not made to a dot position shift of a reference color in the operation of each component of the image recording device according to the first embodiment;

FIG. 5D is a timing chart (4) of the operation when an arrangement correction of a superposed color dot is not made to a dot position shift of a reference color in the operation of each component of the image recording device according to the first embodiment;

FIG. 5E is a timing chart (5) of the operation when an arrangement correction of a superposed color dot is not made to a dot position shift of a reference color in the operation of each component of the image recording device according to the first embodiment;

FIG. 5F is a timing chart (6) of the operation when an arrangement correction of a superposed color dot is not made to a dot position shift of a reference color in the operation of each component of the image recording device according to the first embodiment;

FIG. 7A is a timing chart (1) of the operation when an arrangement correction of a superposed color dot is not made to a dot position shift of a reference color in the operation of each component of the image recording device according to the second embodiment of the present invention;

FIG. 7B is a timing chart (2) of the operation when an arrangement correction of a superposed color dot is not made to a dot position shift of a reference color in the operation of each component of the image recording device according to the second embodiment;

FIG. 7C is a timing chart (3) of the operation when an arrangement correction of a superposed color dot is not made to a dot position shift of a reference color in the operation of each component of the image recording device according to the second embodiment;

FIG. 7D is a timing chart (4) of the operation when an arrangement correction of a superposed color dot is not made to a dot position shift of a reference color in the operation of each component of the image recording device according to the second embodiment;

FIG. 7E is a timing chart (5) of the operation when an arrangement correction of a superposed color dot is not made to a dot position shift of a reference color in the operation of each component of the image recording device according to the second embodiment;

FIG. 7F is a timing chart (6) of the operation when an arrangement correction of a superposed color dot is not made to a dot position shift of a reference color in the operation of each component of the image recording device according to the second embodiment;

FIG. 8A is a timing chart (1) of the operation when an arrangement correction of a superposed color dot is made to a dot position shift of a reference color in the operation of each component of the image recording device according to the second embodiment;

FIG. 8B is a timing chart (2) of the operation when an arrangement correction of a superposed color dot is made to a dot position shift of a reference color in the operation of each component of the image recording device according to the second embodiment;

FIG. 8C is a timing chart (3) of the operation when an arrangement correction of a superposed color dot is made to a dot position shift of a reference color in the operation of each component of the image recording device according to the second embodiment;

FIG. 8D is a timing chart (4) of the operation when an arrangement correction of a superposed color dot is made to a dot position shift of a reference color in the operation of each component of the image recording device according to the second embodiment;

FIG. 8E is a timing chart (5) of the operation when an arrangement correction of a superposed color dot is made to a dot position shift of a reference color in the operation of each component of the image recording device according to the second embodiment;

FIG. 8F is a timing chart (6) of the operation when an arrangement correction of a superposed color dot is made to a dot position shift of a reference color in the operation of each component of the image recording device according to the second embodiment;

FIG. 8G is a timing chart (7) of the operation when an arrangement correction of a superposed color dot is made to a dot position shift of a reference color in the operation of each component of the image recording device according to the second embodiment.

DESCRIPTION OF THE PREFERRED EMBODIMENTS

The embodiments of the present invention are described below with reference to the attached drawings. In the description below, the direction of conveyance of a record medium is referred to as a Y-axis direction or a sub scanning direction, the direction orthogonal to the direction of conveyance is referred to as an X-axis direction or a main scanning direction, and the direction orthogonal to both the X- and Y-axis directions is referred to as a Z-axis direction.

First Embodiment

Figure 1:
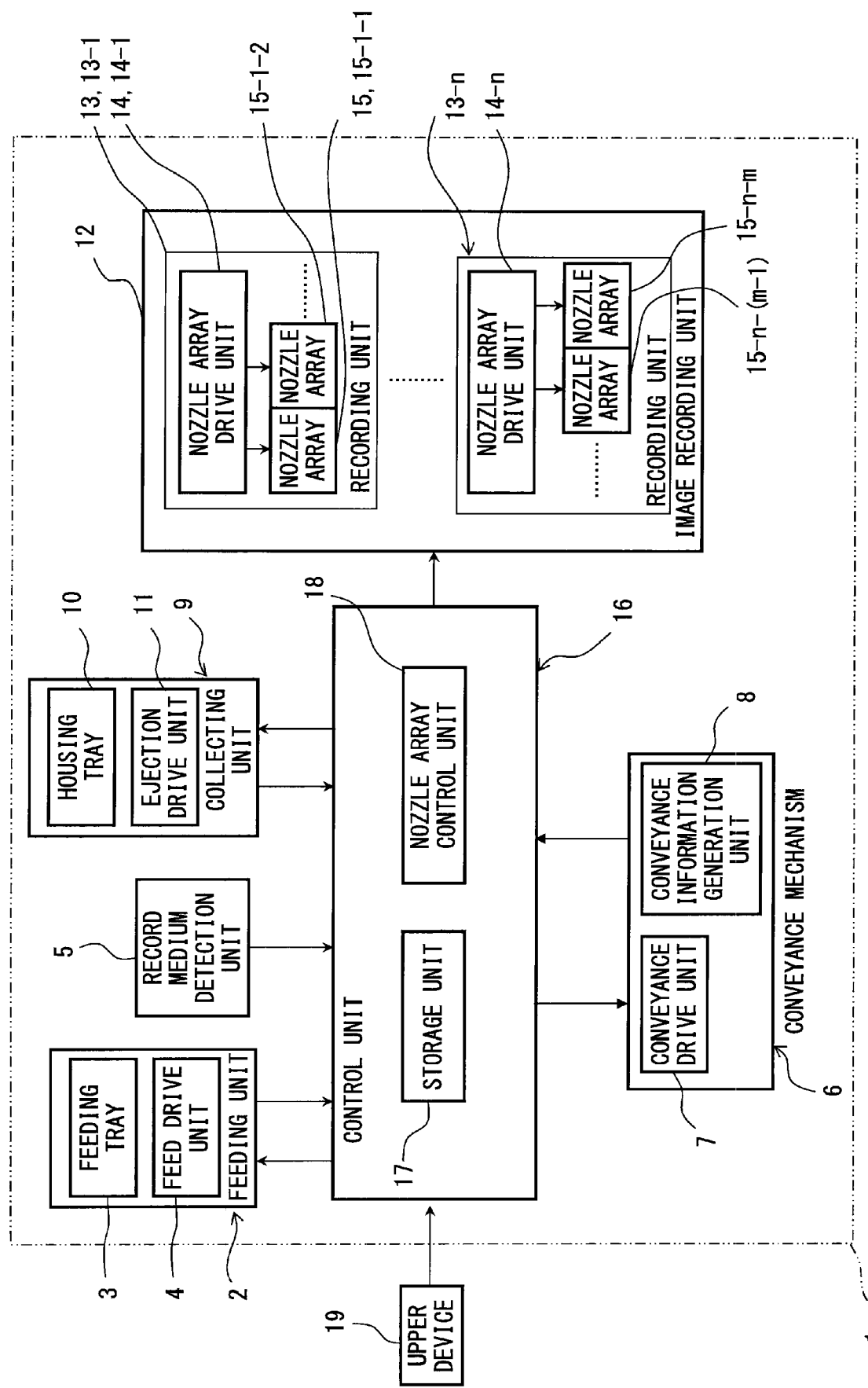
FIG. 1 illustrates a conceptual configuration of a block diagram of the image recording device according to a first embodiment of the present invention.

FIG. 1 illustrates a conceptual configuration of a block diagram of the image recording device according to the present embodiment.

Figure 2:
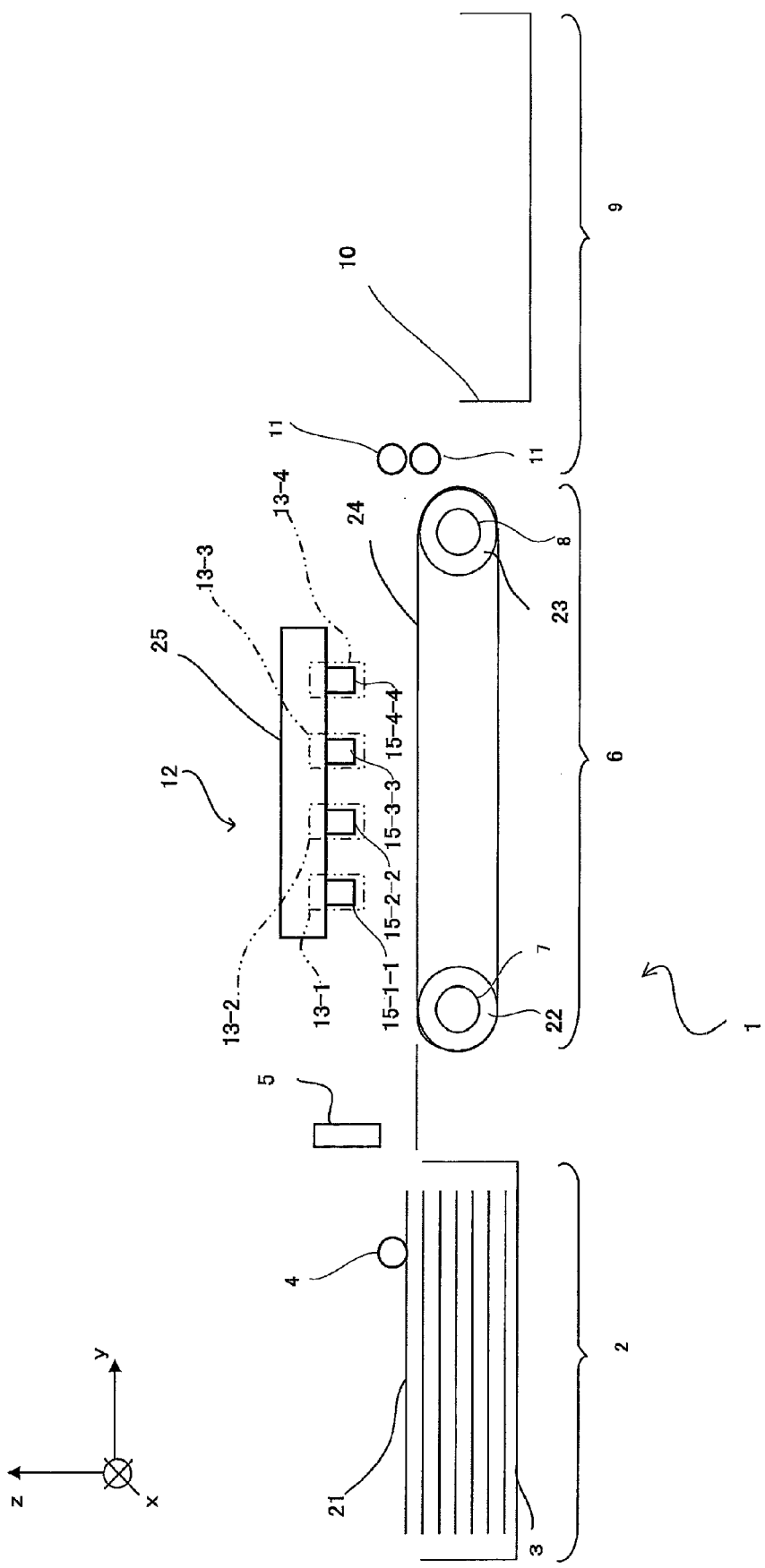
FIG. 2 illustrates the arrangement of each component of the image recording device according to the first embodiment.

FIG. 2 illustrates the arrangement of each component of the image recording device according to the present embodiment. As illustrated in FIGS. 1 and 2, an image recording device 1 according to the present embodiment is provided with a feeding unit 2, a record medium detection unit 5, a conveyance mechanism 6, a collecting unit 9, an image recording unit 12, and a control unit 16.

With the above-mentioned configuration, the feeding unit 2 is provided with a feeding tray 3 and a feed drive unit 4. The feeding tray 3 is configured by, for example, a paper feed cassette etc. and stores a record medium 21. The feed drive unit 4 is configured by, for example, a feeding roller, and touches the surface of the top portion of the record medium 21 stored in the feeding tray 3.

The feeding unit 2 is synchronized with print timing, takes out sheet by sheet the record medium 21 stored in the feeding tray 3 by the feed drive unit 4, and feeds the record medium to the conveyance mechanism 6.

The record medium detection unit 5 is configured by including, for example, any of an optical transmission sensor, a reflection sensor, a capacitance sensor, etc.

The record medium detection unit 5 is provided on the feed path upstream the conveyance mechanism 6 in the conveyance path of the record medium 21, and detects, for example, the front end and back end in the sub scanning direction of the record medium 21 being fed.

When the record medium detection unit 5 detects the front and back ends of the record medium 21, it notifies the control unit 16 of the detection information.

The record medium detection unit 5 can also be configured by including a line sensor such as a CIS (contact image sensor) etc.

In this case, the record medium detection unit 5 can detect the front and back ends and both side positions, and the detection information is transmitted to the control unit 16.

The conveyance mechanism 6 is provided with a driving roller 22 and a driven roller 23 separated from each other in the sub scanning direction, a conveyance drive unit 7 connected to the rotation axis of the driving roller 22, a conveyance information generation unit 8 connected to the rotation axis of the driven roller 23, an endless conveyance belt 24 spanning the driving roller 22 and the driven roller 23, and at least one suction fan not illustrated in the attached drawings.

The suction fan generates a negative pressure under the control by the control unit 16, and adsorbs the record medium 21 on the conveyance belt 24.

The conveyance mechanism 6 conveys the record medium 21 fed from the feeding unit 2 to downstream while adsorbing the medium to the conveyance surface of the conveyance belt 24.

The conveyance belt 24 conveys the record medium 21 at a predetermined speed with the conveyance surface of the record medium 21 facing the ink discharge outlet of at least one or more recording units 13-1 through 13-$n$ ($n$ is an integer of 2 or more) illustrated in FIG. 2.

The conveyance belt 24 is driven by rotation by the driving roller 22 driven by the conveyance drive unit 7, and on the other hand drives the driven roller 23 by rotation.

The conveyance information generation unit 8 connected to the rotation axis of the driven roller 23 is configured by including, for example, a rotary encoder, generates a pulse signal as conveyance information about the record medium 21 each time the conveyance belt 24 moves by rotation by a predetermined amount, and outputs the pulse signal to the control unit 16. Therefore, the pulse signal indicates the conveyance distance of the record medium 21.

The collecting unit 9 is provided with, for example, a housing tray 10 and an ejection drive unit 11. The ejection drive unit 11 is configured by, for example, an ejection roller pair, and ejects the image-recorded record medium 21 conveyed by the conveyance mechanism 6 to the housing tray 10. The housing tray 10 stores the ejected record medium 21.

The image recording unit 12 is provided with at least one or more recording units 13-1 through 13-$n$. The recording units 13-1 through 13-$n$ include nozzle arrays 15-1-1 through 15-$n$-$m$ ($n$ and $m$ are integers of 2 or more) and nozzle array drive units 14-1 through 14-$n$, and are supported by a support member 25.

The nozzle arrays 15-1-1 through 15-$n$-$m$ linearly include a plurality of nozzles for discharging ink. The nozzle arrays 15-1-1 through 15-$n$-$m$ are arranged in the main scanning direction spanning the length exceeding the maximum width of the record medium 21 on the basis of the design of the image recording device 1.

The nozzle array drive units 14-1 through 14-$n$ output the drive signal for driving each nozzle to the nozzle arrays 15-1-1 through 15-$n$-$m$ according to the control signal transmitted on the basis of the record data information from the control unit 16.

The nozzle arrays 15-1-1 through 15-$n$-$m$ discharge ink drops from a plurality of nozzles selected according to the drive signal on the basis of the drive signal from the nozzle array drive units 14-1 through 14-$n$, and record an image on the basis of the nozzle drive signal on the record medium 21 conveyed by the conveyance belt 24 at a predetermined speed.

The image recording unit 12 is further described below.

The recording units 13-1 through 13-$n$ are configured by arranging the plurality of nozzle arrays 15-1-1 through 15-$n$-$m$ as illustrated in FIG. 2 for example.

In FIG. 2, the recording units 13-1 through 13-4 are illustrated as arranged corresponding to four colors of ink, for example, K (black) C (cyan), M (magenta), and Y (yellow).

The character "n" indicates the total number of ink colors, and the maximum value of n in the case illustrated in FIG. 2 is 4. In addition, m indicates the total number of nozzle arrays set regardless of the ink color. In the case in FIG. 2, one nozzle array is arranged for each color. Therefore, the maximum value of m is 4.

The recording units 13-1 through 13-4 are arranged as separate from each other in the sub scanning direction, and drive each of the nozzle arrays 15-1-1 through 15-4-4 with the timing corresponding to the position arranged before and after the conveyance path, thereby performing the recording process on the record medium 21.

The distance moved by the record medium 21 to each of the nozzle arrays 15-1-1 through 15-4-4 after the record medium 21 is detected by the record medium detection unit 5 is generated as the conveyance information by the conveyance information generation unit 8.

The conveyance information is the number of pulse signals depending on the conveyance distance of the record medium 21 generated by, for example, a rotary encoder in the conveyance information generation unit 8.

The intervals at which the dots to be recorded on the record medium 21 are arranged can be determined by setting the number of pulse signals so that they can be generated at the intervals of 300 dpi ($\approx$85 μm) etc.

The nozzle array drive units 14-1 through 14-$n$ select a nozzle according to the record information from an upper device 19, drive the selected nozzle at the timing determined by the ink discharge timing control signal generated by the nozzle array control unit 18 of the control unit 16, and discharge ink.

The control unit 16 includes at least a processing circuit not illustrated in the attached drawings but including, for example, an MPU (microprocessor unit) having a control function and an arithmetic function, a storage unit 17, and a nozzle array control unit 18.

The storage unit 17 is configured by ROM (read only memory) storing a control program, RAM (random access memory) as work memory of the MPU, and non-volatile memory storing specification information about the recording process including record data. The RAM temporarily stores a set value etc. about the control of the device and image record information.

The nozzle array control unit 18 controls the nozzle arrays 15-1-1 through 15-$n$-$m$ on the basis of the set value read from the storage unit 17. The nozzle array control unit 18 is described later in detail.

The control unit 16 controls each component of the image recording device 1, that is, the feeding unit 2, the conveyance mechanism 6, the collecting unit 9, the image recording unit 12, etc. by executing the control program read from the storage unit 17 by MPU.

The control unit 16 records a character and an image (hereinafter referred to simply as an image) on the record medium 21 by the function as the nozzle array control unit 18 for controlling the ink discharge timing of the nozzle arrays 15-1-1 through 15-$n$-$m$.

A series of operations of the image recording process by the image recording device 1 according to the present embodiment having the configuration and the function above are further described below.

First, the upper device 19 is, for example, a computer operated by a user to direct the image recording device 1 according to the present embodiment to perform a recording process.

The upper device 19 is connected as external equipment of the image recording device 1 over, for example, a LAN (local area network) etc.

The upper device 19 notifies the image recording device 1 of the job information as the information about the recording process. The job information includes image record information used when the recording process is performed on the record medium 21.

The image record information also includes the recorded image size information, resolution, density, color information, address information about the image data held in the memory of the upper device 19, etc.

The upper device 19 performs image data processing such as a simulated gray scale converting process for converting multilevel gray scale image data of three primary colors of light of R (red), G (green), and B (blue) into a gray scale value of three primary colors of K, C, M, and Y that can be output by an image recording device.

The upper device 19 transfers the image data to the image recording device 1. Upon receipt of the job information notified from the upper device 19, the control unit 16 of the image recording device 1 stores the information also in the storage unit 17.

Then, upon receipt of the instruction to start the recording process from the upper device 19, the control unit 16 controls the conveyance drive unit 7 to start the rotation of the conveyance belt 24.

Next, the control unit 16 controls the feed drive unit 4 of the feeding unit 2 to feed sheet by sheet the record medium 21 loaded on the feeding tray 3 to the conveyance mechanism 6.

The record medium detection unit 5 detects the record medium 21 fed on the conveyance path by, for example, the edge of the medium.

The record medium detection unit 5 outputs to the control unit 16 a edge signal indicating that the edge has been detected.

The control unit 16 receives the edge signal, and uses the received edge signal as a trigger signal for generation of the record process timing.

Then, after passing through the record medium detection unit 5, the record medium 21 is conveyed downstream the conveyance path, and further conveyed by being adsorbed to the conveyance belt 24 of the conveyance mechanism 6.

The nozzle array control unit 18 converts the image data received from the upper device 19 into record data that can be recorded according to the job information and the set value corresponding to the job information stored in advance in the storage unit 17, and transfers the converted record data to the image recording unit 12.

The image data converting process includes data distribution and data alignment for each nozzle array, recording density conversion, etc.

The nozzle array control unit 18 also controls the ink discharge timing according to the job information from the upper device 19, and determines the recording position on the record medium 21 in the sub scanning direction when the recording process is performed.

The pulse signal of the rotary encoder as the conveyance information generated by the conveyance information generation unit 8 is timing-corrected by the nozzle array control unit 18.

The corrected signal is output to the image recording unit 12, and is used as a synchronization signal (record synchronization pulse signal) when the recording process is performed using the nozzle arrays 15-1-1 through 15-$n$-$m$.

The control unit 16 stores in advance in the storage unit 17 the value of the number of pulse signals of the rotary encoder corresponding to the distance from the record medium detection unit 5 to, for example, the nozzle arrays 15-1-1 through 15-4-4 illustrated in FIG. 2 as the information about the timing for start of the discharge of ink from the nozzle arrays 15-1-1 through 15-$n$-$m$.

The control unit 16 counts the number of pulse signals of the rotary encoder after the edge signal of the record medium 21 is generated.

The nozzle array control unit 18 of the control unit 16 detects the matching between the value of the counted number of pulse signals of the rotary encoder and the value of the number of record synchronization pulse signals corresponding to the distance stored in advance.

Then, the ink is discharged from the nozzle arrays 15-1-1 through 15-4-4 by controlling the nozzle array drive units 14-1 through 14-$n$ of the image recording unit 12 when the matching is detected, and the recording process is performed on the record medium 21 adsorbed to the conveyance belt 24.

After the recording process above, the record medium 21 is transmitted to the collecting unit 9 provided downstream the conveyance mechanism 6.

The record medium 21 is nipped in the ejection drive unit 11, further conveyed downstream the conveyance path, and then stored in the housing tray 10.

Figure 3:
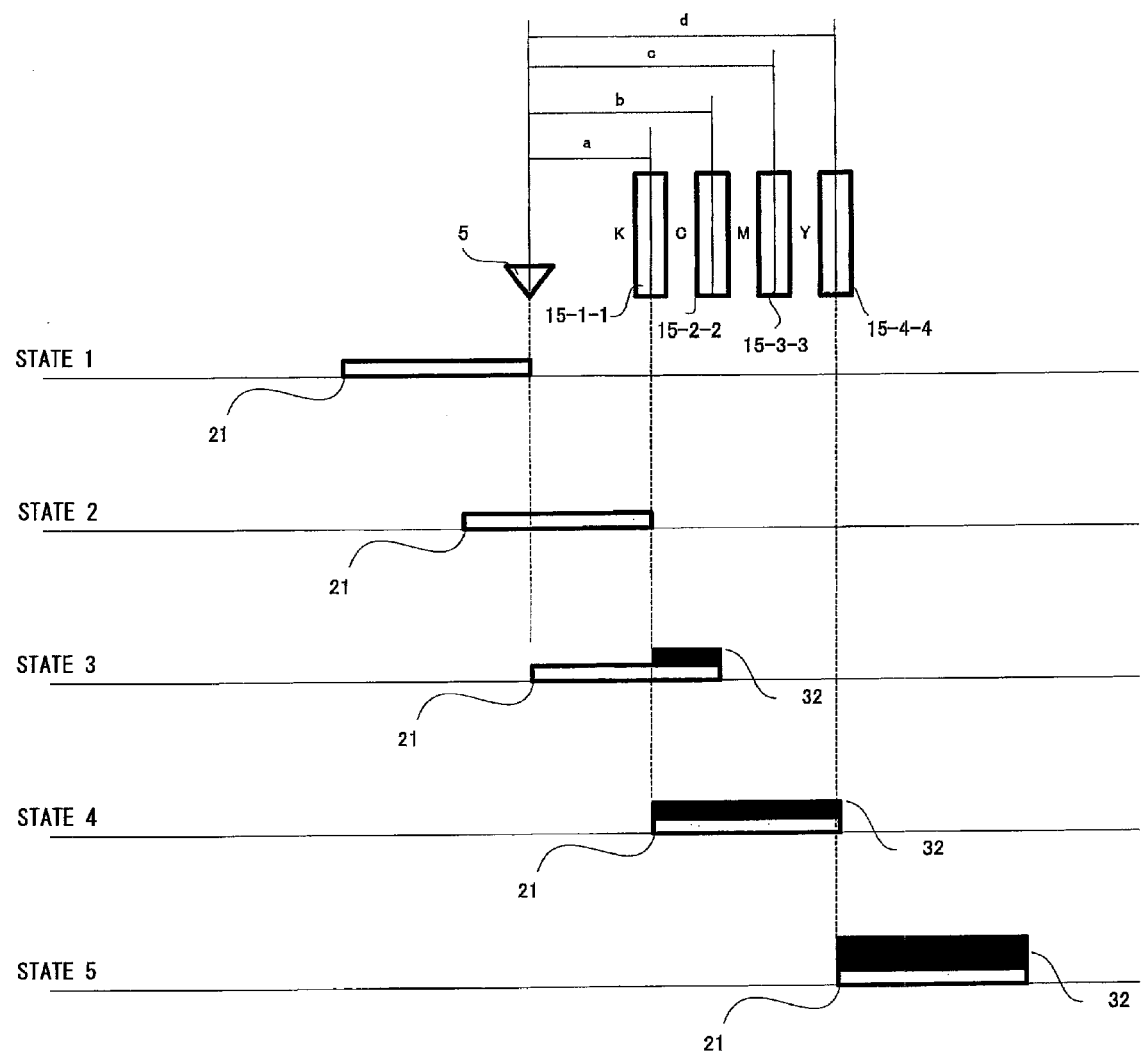
FIG. 3 is a schematic diagram of the relationship between detecting a record medium and recording an image on the image recording device according to the first embodiment.

FIG. 3 is a schematic diagram of the timing relationship between the detection of the record medium 21 and the image recording process in the image recording device 1 according to the present embodiment.

In FIG. 3, the record medium 21 records an image in the conveying process by the conveyance mechanism 6 from the state 1 to the state 5.

The edge of the record medium 21 conveyed from the feeding unit 2 in the direction of conveyance (hereinafter referred to as a leader of conveyance) is detected by the record medium detection unit 5 in the state 1.

Then, when the conveying process is continued and the leader of conveyance of the record medium 21 reaches the position facing the nozzle array 15-1-1 in the color K, the image recording process for the color K is started in the state 2.

The number of encoder pulses corresponding to the conveyance distance from the record medium detection unit 5 to the nozzle array 15-1-1 is stored in the storage unit 17 in advance, and the number of pulses is used in generating a drive synchronization pulse signal of the nozzle array control unit 18.

Therefore, when the number of record synchronization pulse signals matches the number of pulse signals generated by the nozzle array control unit 18 after the leader of conveyance of the record medium 21 practically passes the detection area of the record medium detection unit 5, the nozzle array control unit 18 discharges the ink from the nozzle array 15-1-1 to perform the recording process on the record medium 21.

Then, the conveyance is further continued, and the end edge of the record medium 21 in the direction of conveyance (hereinafter referred to as a trailer of conveyance) is conveyed to the detection area of the record medium detection unit 5, and detected therein in the state 3.

In this state, the image recording operation with the colors K and C has been started already, and an image 32 is recorded by the discharged ink on the record medium 21.

In the state 4, the image recording operation is continued with the colors C, M, and Y, and the image 32 is further recorded with the discharged ink on the record medium 21.

In the state 4, the recording operation of the image 32 with the ink of the color K using the nozzle array 15-1-1 is completed, and the recording operation of the image with the ink of the color C using the nozzle array 15-2-2 and recording operation of the image with the ink of the color M using the nozzle array 15-3-3 are being performed.

Also in the state 4, the leader of conveyance reached the portion facing the nozzle array 15-4-4, and the recording operation with the ink of the color Y using the nozzle array 15-4-4 starts by superposing the color on the image 32 in three preceding colors.

Then, the conveyance further continues, and the image recording with the color Y is completed after the trailer of conveyance of the record medium 21 reaches the nozzle array 15-4-4 for the color Y in the state 5.

In the state 5, the image recording operations with the colors K, C, and M have been completed, and the image 32 in all of four colors has been completely recorded on the record medium 21.

FIGS. 4A and 4B are explanatory views of the head drive frequency upper limit correction of a record synchronization pulse signal in the nozzle array control unit 18 according to the present embodiment.

A curve 26 like a sine wave illustrated in FIG. 4A indicates the fluctuation in time of the frequency of a pulse signal of an encoder as the conveyance information generated by the conveyance information generation unit 8.

The drive frequency indicated by a broken line 27 refers to a head drive upper limit frequency. The head drive upper limit frequency 27 refers to the upper limit frequency when the data transfer to a recording unit cannot be completed, or when the recording unit becomes faulty in discharging ink.

The nozzle array control unit 18 determines whether or not the frequency of a pulse signal of an encoder, that is, the frequency of a record synchronization pulse signal, is higher than the head drive upper limit frequency 27.

The determination is made by comparing the cycle measurement result of the encoder pulse signal with the head drive shortest cycle stored in non-volatile memory in advance.

The head drive upper limit frequency and the head drive shortest cycle describe the same object as defined from different viewpoints. In the process in the circuit of the control device, a cycle is relatively easier than a frequency in a comparison operation. Therefore, the frequency of an encoder pulse signal is converted into a cycle, and is compared with the head drive shortest cycle stored in advance.

A plurality of head drive shortest cycles can be stored in advance depending on a plurality of print modes having different relative scanning speeds between the record medium 21 and the recording units 13-1 through 13-n, and a head drive shortest cycle can be selected depending on the print mode.

In the description below, the recording unit 13-1 is defined as a recording unit K, the recording unit 13-2 as a recording unit C, the recording unit 13-3 as a recording unit M, and the recording unit 13-4 as a recording unit Y.

In addition, the dots of ink drops discharged from each of the recording units K, C, M, and Y to the record medium 21 are defined as dots of the reference color K, dots of the No. 2 color C, dots of the No. 3 color M, and dots of the No. 4 color Y.

Back to the description with reference to FIGS. 4A and 4B, the measurement of the cycle of the encoder pulse signal is made using a timer on the basis of the clock signal of the circuit.

From time T0 to time T1, the encoder pulse frequency is lower than the head drive upper limit frequency according to the comparison. Therefore, the nozzle array control unit 18 outputs the encoder pulse signal as-is as a record synchronization pulse signal.

From time T1 to time T2, the encoder pulse signal frequency is higher than the head drive upper limit frequency 27 as indicated by a diagonally shaded portion 28 by the comparison above.

The nozzle array control unit 18 measures the timer on the basis of the clock signal of the circuit, generates a pulse signal of the head drive upper limit frequency stored in the non-volatile memory in advance, and outputs the generated pulse signal of the head drive upper limit frequency as a correction record synchronization signal 33, thereby replacing the signal of the head drive upper limit frequency.

Therefore, from time T1 to time T2 in FIG. 4A, the head drive frequency by the record synchronization signal is lower than the encoder pulse frequency. That is, the head drive cycle is longer than the encoder pulse signal cycle.

Thus, if the head drive cycle is longer than the encoder pulse signal cycle, the head drive timing is delayed for the encoder signal.

Therefore, since the encoder signal is output corresponding to the conveyance distance of the record medium 21, the recording dots are arranged after being shifted to the trailer of conveyance of the record medium 21 from the equal interval reference position of, for example, 300 dpi from time T1 to time T2.

A straight line 29 indicating an increasing amount of shift from time T1 to time T2 in FIG. 4B indicates the amount of shift in the dot arrangement on the record medium 21 from the equal interval reference position.

If the head drive frequency exceeds the encoder pulse signal frequency by several percent, then the dot arrangement is shifted by several μm from the equal interval reference position. If the status continues by covering a plurality of encoder pulse signals, then the amounts of shift are accumulated, thereby causing multiple shifts.

In FIG. 4A, after time T2, the encoder pulse signal frequency is lower than the head drive upper limit frequency. However, if the encoder pulse signal is output as-is as a record synchronization pulse signal immediately after time T2, then the shift of the dot arrangement from the equal interval reference position to the trailer of conveyance of the record medium 21 caused from time T1 to time T2 is continued and recorded.

The shift can be corrected the amount of shift between time T2 and time T3 as indicated by a line 30 indicating a decreasing amount of shift illustrated in FIG. 4B and solved at and after time T3, by outputting a frequency 34 obtained by correcting the record synchronization pulse signal as a frequency higher than the encoder pulse signal frequency and lower than the head drive upper limit frequency depending on the shift caused at the diagonally shaded portion 28 as a correction record synchronization signal.

To correct the amount of shift, control is performed to obtain an equal amount of return to the equal interval reference position in the forward direction of conveyance in the main line shaded portion 31 with the shift from the equal interval reference position generated in a diagonally shaped portion 28.

A practical example is to control the corrected frequency 34 so that the area of the diagonally shaded portion 28 can be equal to the area of the main line shaded portion 31. The interval between time T0 and time T2 illustrated in FIGS. 4A and 4B is one through several seconds.

If the conveying speed of the record medium 21 is made lower so that the encoder pulse signal frequency can be sufficiently lower than the head drive upper limit frequency not to cause a diagonally shaded portion 28 in FIG. 4A, it is not necessary to correct the upper limit of the head drive frequency of the record synchronization pulse signal.

However, if a safety range is wide, the conveying speed of the record medium 21 is low and the throughput of the recording process is degraded.

In the present embodiment, the control of the correction record synchronization signal 33 and the corrected frequency 34 as illustrated in FIGS. 4A and 4B is performed to enhance the throughput of the recording process while performing the process with the incomplete data transfer to the recording unit and the occurrence of a faulty discharge of ink successfully avoided.

Described below is an arrangement correction of a superposed printing dot (hereinafter referred to as a superposed color dot) when a recording operation is performed with the dots of plural colors superposed on one another in recording unit corresponding to plural colors of the image recording device 1 according to the present embodiment.

FIGS. 5A through 5F are timing chart of the operation when an arrangement correction of the superposed color dots is not made to the dot position shift of a reference color in the operation of each component of the image recording device 1.

The superposed color dots of the reference color K and the No. 2 color C is described on the assumption that there is no dot position shift of the No. 2 color C with respect to the reference color K for which a correction is made to the dot arrangement illustrated in FIGS. 4A and 4B.

The contents of FIGS. 5A, 5B, and 5C are the same as those of FIGS. 4A and 4B. The difference is that the curve is not a sine wave as illustrated in FIG. 4A, and a comprehensible straight line is expressed in FIGS. 5A and 5B with respect to the fluctuation of time of the encoder pulse signal frequency.

FIG. 5A illustrates a frequency of a pulse signal of an encoder generated by the conveyance information generation unit 8.

In time T0 through time T1, the frequency 26-0 of an encoder pulse signal is lower than the head drive upper limit frequency 27. In time T1 through time t2, the encoder pulse signal frequency 26-1 is higher than the head drive upper limit frequency 27. In and after time T2, the encoder pulse signal frequency 26-0 is lower than the head drive upper limit frequency 27.

FIG. 5B illustrates the record synchronization signal obtained by correcting the upper limit of the head drive frequency of the recording unit K forward in the direction of conveyance (hereinafter referred to as forward in the direction of conveyance) of the record medium 21 in the recording units forming the superposed color dots corresponding to the fluctuation of time of the encoder pulse signal frequency illustrated in FIG. 5A.

In time T1 through time T2, since the encoder pulse signal frequency 26-1 exceeds the head drive upper limit frequency 27, the head drive frequency upper limit correction of the recording unit K is performed, and the record synchronization signal (26-1) is replaced with the frequency (correction record synchronization signal) 33 equal to the head drive upper limit frequency 27.

In time T2 through time T4, to correct the shift of the dot arrangement behind in the direction of conveyance of the record medium 21 from the equal interval reference position generated up to time T2, that is, as in the case illustrated in FIG. 4A, a correction is made to output the frequency 34 corrected into a frequency higher than the encoder pulse signal frequency and lower than the head drive upper limit frequency depending on the dot position shift caused in the diagonally shaded portion 28.

Thus the shift of the dot arrangement is corrected, and the dot arrangement in and after time T4 is recovered to a normal state. Therefore, in and after time T4, a drive frequency 35 is output to the recording unit K as a drive frequency synchronized with the encoder pulse signal 26-0.

FIG. 5C illustrates the shift of the dot arrangement from the equal interval reference position of the reference color K behind in the direction of conveyance when the recording unit K performs a printing operation using the correction record synchronization signal 33 illustrated in FIG. 5B and the corrected frequency 34.

That is, FIG. 5C illustrates the amount 29 of position shift of the dot arrangement by the correction record synchronization signal 33 as the result coped to the frequency fluctuation of the encoder pulse signal, and the amount 30 of position shift in the correction direction of the dot arrangement by the corrected frequency 34 to correct the amount of position shift. This status is the same as that illustrated in FIG. 4B.

FIG. 5D illustrates the state moved in parallel from the state of the shift of the dot arrangement of the recording unit K illustrated in FIG. 5C by the time Tkc corresponding to the conveyance the record medium 21, on which the superposed color dots are recorded to the recording position of the recording unit C adjacent to the recording unit K behind in the direction of conveyance of the record medium 21 in the plurality of recording unit s forming the superposed color dots.

In the recording unit C, the image of the reference color K of the recording unit K and the image of the No. 2 color C are superposed, thereby forming the image of the superposed color dots of the colors K and C.

That is, FIG. 5D illustrates the state in which the dot arrangement portion of the reference color K printed in time T1, T2, and T4 in which the position shift of the dot arrangement of the reference color K starts and the correction to the shift is completed moves and passes the printing position of the No. 2 color C by the conveyance of the record medium 21.

The elapsed time in each section in time T3, T5, and T6 illustrated in FIG. 5D is equal to the elapsed time in each section in time T1, T2, and T4 illustrated in FIG. 5C.

FIG. 5E illustrates the shift of the dot arrangement from the equal interval reference position of the recording unit C behind in the direction of conveyance of the record medium 21 when it is not necessary to correct the arrangement of superposed color dots.

In this example, the state of the dot arrangement is obtained when the image of the No. 2 color C is recorded by the recording unit C, the curve 26 does not exceed the head drive upper limit frequency 27, and there is no shift of the dot arrangement from the equal interval reference position in the recording unit C.

That is, the state is represented by the straight line, because there is no position shift of the dot.

FIG. 5F illustrates the position shift of the recorded dots of the No. 2 color C of the recording unit C for the recorded dots of the reference color K of the recording unit K when it is not necessary to correct the arrangement of the superposed color dots of the NO. 2 color C as described above.

That is, since no dot position shift is detected in the No. 2 color C, there relatively occurs a dot position shift in the No. 2 color C on the reference color K having a dot position shift.

Since the dots of the No. 2 color C are arranged at the equal interval reference position, the dot arrangement of the No. 2 color C precedes the reference color K in the dot position delay period (time T3 through T5) of the reference color K, and the dot arrangement of the No. 2 color C delays relative to the dot arrangement of the preceding reference color K in the correction period (time T5 through T6) of the reference color K.

Therefore, the amount of delay of the superposed color dots of the No. 2 color C relative to the reference color K is represented by the straight lines 36 and 37 as negative values of the straight lines 29 and 30 indicating the amount of delay of the reference color K illustrated in FIG. 5D Thus, if only the "head drive frequency upper limit correction" is made by the adjustment of delaying the discharge timing when the encoder pulse signal frequency exceeds the head drive upper limit frequency and the adjustment of correcting the delay when the encoder pulse signal frequency is equal to or lower than the head drive upper limit frequency, there occurs no serious problem using a monochrome image recording device described with reference to FIGS. 4A and 4B.

However, as described above with reference to FIGS. 5A through 5F, in the image recording device provided with line heads for plural colors in the direction of conveyance, each color is recorded on a record medium at different position for each color with a shift behind in the direction of conveyance. Therefore, an arrangement shift of a superposed color dot occurs and causes outstanding color variations.

FIGS. 6A through 6G are timing charts of the operations when arrangement correction of superposed color dots is made to the dot position shift of the reference color in the operation of each component of the image recording device 1. FIGS. 6A through 6D are similar to FIGS. 5A through 5D.

Figure 6A:
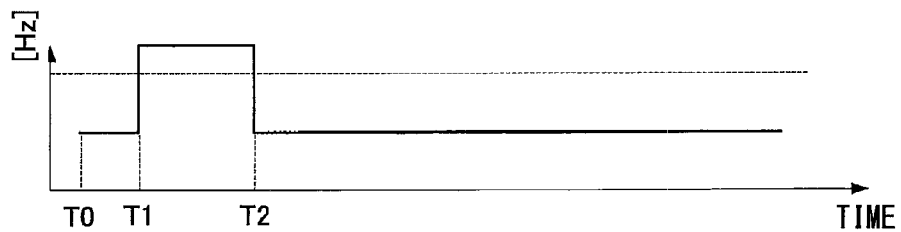
FIG. 6A is a timing chart (1) of the operation when an arrangement correction of a superposed color dot is made to a dot position shift of a reference color in the operation of each component of the image recording device according to the first embodiment.
Figure 6B:
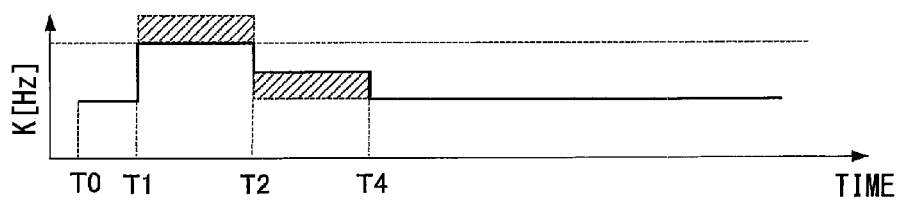
FIG. 6B is a timing chart (2) of the operation when an arrangement correction of a superposed color dot is made to a dot position shift of a reference color in the operation of each component of the image recording device according to the first embodiment.
Figure 6C:
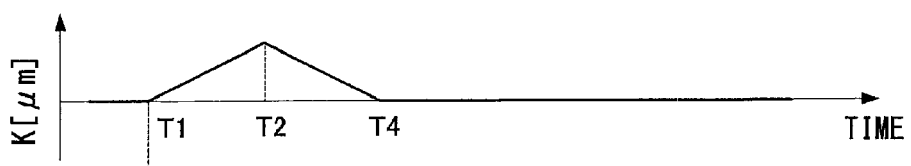
FIG. 6C is a timing chart (3) of the operation when an arrangement correction of a superposed color dot is made to a dot position shift of a reference color in the operation of each component of the image recording device according to the first embodiment.
Figure 6D:
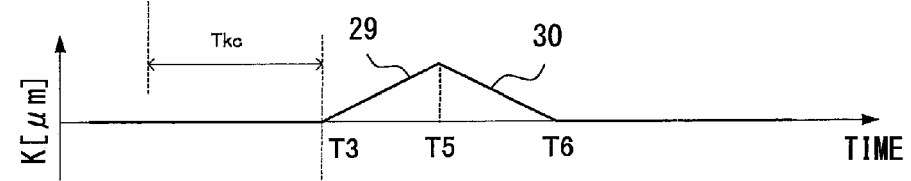
FIG. 6D is a timing chart (4) of the operation when an arrangement correction of a superposed color dot is made to a dot position shift of a reference color in the operation of each component of the image recording device according to the first embodiment.
Figure 6E:
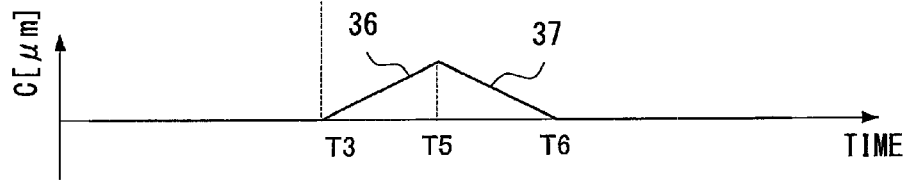
FIG. 6E is a timing chart (5) of the operation when an arrangement correction of a superposed color dot is made to a dot position shift of a reference color in the operation of each component of the image recording device according to the first embodiment.
Figure 6F:
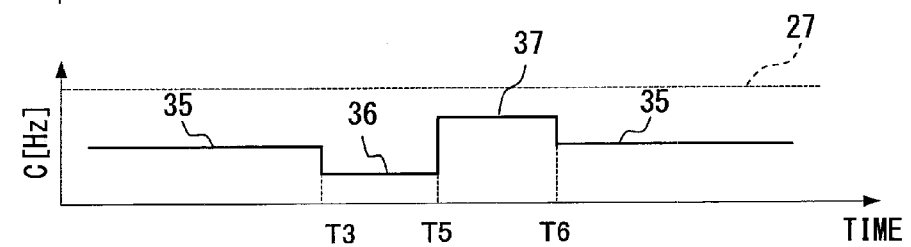
FIG. 6F is a timing chart (6) of the operation when an arrangement correction of a superposed color dot is made to a dot position shift of a reference color in the operation of each component of the image recording device according to the first embodiment.
Figure 6G:
FIG. 6G is a timing chart (7) of the operation when an arrangement correction of a superposed color dot is made to a dot position shift of a reference color in the operation of each component of the image recording device according to the first embodiment.

In the present embodiment, FIGS. 6E through 6G, unlike the cases in FIGS. 5E and 5F, illustrate the effect obtained when a correction of the dot arrangement is made to the superposed color dot of the No. 2 color C.

First, the nozzle array control unit 18 stores for each line head the amount 29 of shift of the dot arrangement from the equal interval reference position of the recording unit K, or the information with which the amount 29 of shift can be calculated by head drive frequency upper limit correction represented by FIG. 6D to the arrangement correction of the superposed color dots in and after the No. 2 color by the recording unit downstream.

The stored amount of shift can be calculated from the difference between the cycle measurement result of the encoder pulse signal and the head drive shortest cycle stored in the non-volatile memory in advance, that is, the amount of correction in head drive frequency upper limit correction represented by FIG. 6B.

FIG. 6E illustrates the superposed color dot arrangement of the recording unit C adjacent to the recording unit K forward in the direction of conveyance of the record medium 21 in the recording units forming the superposed color dots.

The arrangement of the superposed color dots of the recording unit C is corrected, and FIG. 6E illustrates the amounts 36 and 37 of shift of the dot arrangement from the equal interval reference position of the recording unit C behind in the direction of conveyance of the record medium 21 after the correction of the dot arrangement.

The feature of the correction of the superposed color dot according to the present embodiment is to control the dot arrangement shift position from the equal interval reference position of the recording unit C forward in the direction of conveyance so that the position can be aligned with the dot arrangement shift position from the equal interval reference position stored in advance of the recording unit K behind in the direction of conveyance illustrated in FIG. 6D.

FIG. 6F illustrates the record synchronization signals 35, 36, and 37 whose arrangements of superposed color dots have been corrected by the nozzle array control unit 18. The signals 35, 36, and 37 depend on the recording unit C forward in the direction of conveyance of the record medium 21 in the recording units forming superposed color dots.

By the correction control, the correction of shift of the dot arrangement of the recording unit C forward in the direction of conveyance illustrated in FIG. 6E is made to the position-shifted record dots of the recording unit K illustrated in FIG. 6D.

That is, in time T3 through T5, since the dots recorded by the recording unit K behind in the direction of conveyance are shifted toward the trailer of conveyance of the record medium 21 from the equal interval reference positions as indicated by the amount 29 of shift of the dot arrangement in FIG. 6D, the downstream recording unit C reduces a record synchronization signal frequency 36 to a level lower than a cycle measurement result 35 of the encoder pulse signal to be aligned to the position as illustrated in FIG. 6F.

In time T5 through T6, the dots recorded by the recording unit K behind in the direction of conveyance are controlled to correct the shift from the equal interval reference position toward the leader of conveyance of the record medium 21 as indicated by the amount 30 of shift of the dot arrangement illustrated in FIG. 6D.

Therefore, the downstream recording unit C increases a record synchronization signal frequency 37 to a level higher than a cycle measurement result 35 of the encoder pulse signal to be aligned to the position as illustrated in FIG. 6F.

FIG. 6G illustrates the position shift of the record dots of the recording unit C relative to the record dots of the recording unit K after the arrangement correction is made to the superposed color dots.

Since the shift in FIG. 6D is equivalent to the shift in FIG. 6E, the problem of the position shift of the record dots of the recording unit C relative to the record dots of the recording unit K can be solved although there is a shift from the equal interval reference position.

Thus, while recording data with the recording throughput as high as possible, the occurrence of an incomplete data transfer to the recording unit and a faulty discharge of ink can be avoided, the position shift of the superposed color dots occurring by the control can be reduced, and the degradation of record image quality can be suppressed.

Described above with reference to FIGS. 5A through 5F and FIGS. 6A through 6G is the arrangement shift of superposed color dots depending on the presence/absence of the arrangement correction of the superposed color dots when the encoder pulse signal frequency exceeds the head drive upper limit frequency in the recording unit K of the reference color K and the encoder pulse signal frequency does not exceed the head drive upper limit frequency and no shift occurs in the dot arrangement of the No. 2 color C from the equal interval reference position when an image in the No. 2 color C is recorded by the recording unit C forward in the direction of conveyance of the record medium 21.

Second Embodiment

Described is the arrangement shift of the superposed color, dots depending on the presence/absence of the arrangement correction of the superposed color dots when the encoder pulse signal, frequency exceeds the head drive upper limit frequency and the recording unit K and the recording unit C generate the shift of dot arrangement from the equal interval reference position when the recording unit K behind in the direction of conveyance and the downstream recording unit C record images.

The configuration and basic operations of the image recording device according to the present embodiment is the same as those in the cases illustrated in FIGS. 1 through 3.

FIGS. 7A through 7F are timing charts of the operations when no arrangement correction of the superposed color dots is made to the dot position shift of the reference color in the operation of each component of the image recording device according to the second embodiment.

The timing charts in FIGS. 7A through 7D are the same as those in FIGS. 5A through 5D.

In the present embodiment, FIGS. 7E and 7F illustrate the case in which only the correction of the shift of the dot arrangement from the equal interval reference position is made to the superposed color dots in the No. 2 color C, and no arrangement correction of the superposed color dots in the No. 2 color C relative to the dot position shift of the reference color K (arrangement correction of the superposed color dots) is made.

FIG. 7E illustrates the state in which there occurs a arrangement shift of the dot arrangement from the equal interval reference position toward behind in the direction of conveyance of the record medium 21 because the encoder pulse signal frequency for the recording unit C forward in the direction of conveyance exceeds the head drive upper limit frequency between time T1 and time T2.

FIG. 7E illustrates the state in which the dot arrangement has been shifted from the equal interval reference position to forward in the direction of conveyance of the record medium 21 to correct the delay of the dot arrangement between time T2 and time T4 because the encoder pulse signal frequency becomes lower than the head drive upper limit frequency in time T2.

FIG. 7F illustrates the position shift of the record dots of the recording unit C relative to the record dots of the recording unit K in the direction of conveyance when no arrangement correction is made to the superposed color dots.

The difference between the dot position shift of the No. 2 color C in FIG. 7E and the dot arrangement shift of the reference color K in FIG. 7D is the dot arrangement shift of the No. 2 color C relative to the reference color K in FIG. 7F.

As described above, when only the head drive upper limit frequency correction is made, there occurs no serious problem with a monochrome image recording device. However, with an image recording device provided with line heads for a plurality of colors in the direction of conveyance, the dot arrangement in a recording unit forward in the direction of conveyance relative to the recording unit behind in the direction of conveyance generates an arrangement shift of the superposed color dots respectively shifted in the directions forward in the direction of conveyance and behind in the direction of conveyance, thereby causing outstanding color variations.

FIGS. 8A through 8G are timing charts of the operations when an arrangement correction is made to the superposed color dots relative to the dot position shift of the reference color in the operation of each component of the image recording device according to the second embodiment.

The timing charts in FIGS. 8A through 8D are the same as those in FIGS. 7A through 7D. FIGS. 8E through 8F illustrate the effect obtained when an arrangement correction of the superposed color dots is made on the shifts illustrated in FIGS. 7E through 7F.

In the present embodiment, the nozzle array control unit 18 stores for each line the amount of shift of the recording unit k from the equal interval reference position by the head drive frequency upper limit correction illustrated in FIG. 8D, or the information for use in calculating the amount of shift to made an arrangement correction to the superposed color dots in the recording unit forward in the direction of conveyance.

The amount of shift can be calculated from the difference between the cycle measurement result of the encoder pulse signal and the head drive shortest cycle stored in the nonvolatile memory in advance in the head drive frequency upper limit correction illustrated in FIG. 8B, that is, an amount of correction.

FIG. 8D illustrates a result of moving in parallel the shift of the dot arrangement in the recording unit illustrated in FIG. 8C by time Tkc corresponding to the conveyance of the record medium 21 on which superposed color dots are formed to the recording position of the recording unit C adjacent to the recording unit K behind in the direction of conveyance of the record medium 21 in the plurality of recording units for forming superposed color dots.

FIG. 8E illustrates the shift of the dot arrangement from the equal interval reference position to behind in the direction of conveyance of the record medium 21 after the arrangement correction of the superposed color dots by the recording unit C forward in the direction of conveyance of the record medium 21 relative to the recording unit K.

In FIG. 8E, an arrangement correction (time T3, T5, and T6) of the superposed color dots to align the dot arrangement shift of the reference color K besides the head drive frequency upper limit correction (time T1, T2, and T4) of the recording unit C forward in the direction of conveyance relative to the recording unit K is made.

FIG. 8F illustrates the record synchronization signals 35, 33, 34, 36, 37, and 35 for drive of the nozzles of the recording unit C after the arrangement correction is made to the superposed color dots as illustrated in FIG. 8E as well as the head drive frequency upper limit correction. The control is performed by the nozzle array control unit 18.

In the situation in time T1 through time T2 illustrated in FIG. 8F, no dot arrangement shift occurs from the equal interval reference position in the record dots of the recording unit K behind in the direction of conveyance. However, since the encoder pulse signal frequency 26-1 is higher than the head drive upper limit frequency 27 in the recording unit C, the head drive frequency upper limit correction is made on the basis of "record synchronization signal 33=head drive upper limit frequency 27".

Then, the recording unit C forward in the direction of conveyance temporarily enhances the frequency of the record synchronization signal 34 in time T2 through time T5 to correct the dot arrangement shift from the equal interval reference position by the head drive frequency upper limit correction up to time T2 on the encoder pulse signal frequency 35 lower than the head drive upper limit frequency 27.

Afterwards, the frequency of the record synchronization signal 36 is reduced for the alignment to the recording position of the recording unit K behind in the direction of conveyance by the position correction of the superposed color dots.

Furthermore, the recording unit C enhances the frequency of the record synchronization signal 37 by the position correction of the superposed color dots for the alignment to the record dot position for correction of the delay of the recording unit K in time T5 through time T6.

FIG. 8G illustrates the amount of position shift of the record dots of the recording unit C relative to the record dots of the recording unit K behind in the direction of conveyance of the record medium 21 after the arrangement correction of the superposed color dots is performed. The difference between FIG. 8E and FIG. 8D indicates the amount of shift.

The amount of shift up to time T3 depends on the head drive upper limit frequency correction of the recording unit forward in the direction of conveyance, and has not been corrected, and the shift in and after time T3 is corrected by the position correction of the superposed color dots.

On the other hand, in FIG. 7F above, the dot arrangements by the recording unit forward in the direction of conveyance relative to the recording unit behind in the direction of conveyance are respectively shifted forward and backward in the direction of conveyance, thereby causing outstanding color variations.

On the other hand, in FIG. 8G, the position shift occurs only in one direction, thereby reducing the outstanding color variations.

With reference to FIGS. 5A through 5F, 6A through 6G, 7A through 7F, 8A through 8G, the two-color recording units forward and behind in the direction of conveyance are described.

The dot arrangement by the recording unit forward in the direction of conveyance is controlled so that it can be aligned to the dot arrangement shift from the equal interval reference position of the recording unit behind in the direction of conveyance by the control also for three or more record colors as in the case above, and the control method can be used also for three or more colors.

In this case, it is desired that a process of an independent shift value is performed by each recording unit or each nozzle array depending on the request precision.

Figure 9:
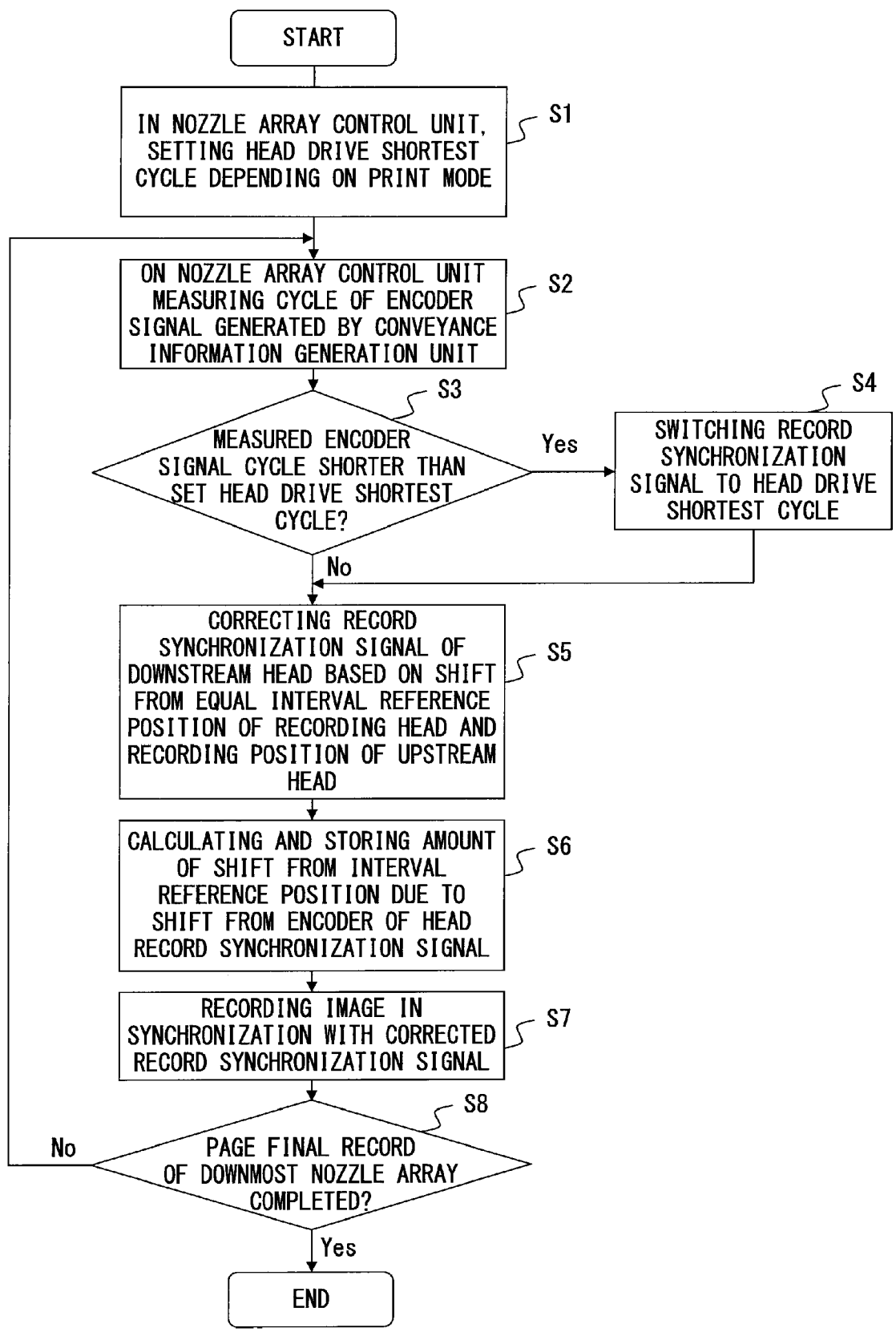
FIG. 9 is a flowchart of the process contents of the control process performed by the control unit for recording an image by the image recording device according to the second embodiment.

FIG. 9 is a flowchart of the process contents of the controlling process performed by the control unit 16 for recording an image by the image recording device 1 according to the second embodiment.

The process is realized by the MPU reading and executing the control program stored in advance in the non-volatile memory of the control unit 16 not illustrated in the attached drawings.

Also by the MPU executing the control program, the control unit 16 functions as the nozzle array control unit 18.

In FIG. 9, the control unit 16 first sets the head drive shortest cycle depending on the print mode in the nozzle array control unit 18 (step S1).

In this process, it is considered that the head drive shortest cycle depends on the print mode, and each head drive shortest cycle is stored in the non-volatile memory in advance.

In the process in the subsequent steps S2 through S8, the process is repeatedly performed for each line image record by the nozzle array synchronized with the record synchronization signal.

That is, the control unit 16 measures the cycle of an encoder signal generated by the conveyance information generation unit 8 in step S2.

Next, the control unit 16 determines in step S3 whether or not a measured encoder signal cycle is shorter than a head drive shortest cycle (hereinafter referred to as a set head drive shortest cycle) stored (set) in non-volatile memory in advance.

If the control unit 16 determines that the measured encoder signal cycle is shorter than the set head drive shortest cycle (when the determination result is YES), control is passed to step S4.

On the other hand, if the control unit 16 determines that the measured encoder signal cycle is longer than the set head drive shortest cycle (when the determination result is NO), control is passed to step S5.

The control unit 16 switches a record synchronization signal into a head drive shortest cycle by the head drive frequency upper limit correction in step S4.

The control unit 16 considers the shift from the equal interval reference position of the record dots of a recording unit in the recording process, and the shift from the equal interval reference position of the record dots by a recording unit behind in the direction of conveyance (upstream), and corrects the record synchronization signal of the recording unit forward in the direction of conveyance (downstream) in step S5. The correction corresponds to the position correction of superposed color dots.

Next, the control unit 16 calculates and stores the amount of shift from the equal interval reference position due to the shift from the measured encoder signal of the head record synchronization signal in step S6.

In the process in step S6, an independent value is process in each recording unit or each nozzle array depending on the request precision.

Next, the control unit 16 drives a nozzle array drive unit 13 in synchronization with a corrected record synchronization signal and records an image in step S7.

Then, the control unit 16 determines in step S8 whether or not a page final record has been completed by the nozzle array of the recording unit in front in the direction of conveyance (downmost).

When the control unit 16 determines that the page final record of the nozzle array of the downmost recording unit has been completed (when the determination result is YES), the page recording process is terminated.

On the other hand, if the control unit 16 determines that the page final record of the nozzle array of the downmost recording unit is not completed (when the determination result is NO), control is returned to step S2. Afterwards, it repeats the process each line image recorded by the nozzle array synchronized with the record synchronization signal.

The above-mentioned processes are performed by the control unit 16, thereby avoiding an incomplete data transfer to a recording unit or a faulty ink discharge of a nozzle array while enhancing the recording throughput as much as possible during the recording operation, reducing the shift of the superposed color dots caused by the controlling operation, and also reducing the degradation of recorded images.

As described above, the present invention can provide an image recording device and an image recording method for the device capable of avoiding an incomplete data transfer to a recording head or a faulty ink discharge during the image recording process in which the relative scanning speed fluctuates between a record medium and a recording head, and reducing a dot position shift in each color in superposed printing caused by the control, thereby suppressing the degradation of the quality of recorded images.

The present invention is not limited to the above-mentioned embodiment, and can realize a number of variations within the scope of the gist of the present invention in practical embodying stages.

What is claimed is:

1. An image recording device having a conveyance mechanism for generating conveyance information about a record medium when the record medium is conveyed after being received upstream from a conveyance path, and a plurality of recording units, each of the plurality of recording units being provided with at least one nozzle array comprising a plurality of nozzles arranged in a direction orthogonal to a direction of conveyance of the record medium, and the plurality of recording units being arranged at predetermined intervals in the direction of conveyance so as to discharge ink by driving the plurality of nozzles of each recording unit, thereby performing a recording process on the record medium, the image recording device comprising:

an encoder signal cycle measuring device for measuring an encoder signal cycle as the conveyance information about the record medium;

a first nozzle drive cycle replacement device for replacing a nozzle drive cycle with a predetermined set cycle when the encoder signal cycle measured by the encoder signal cycle measuring device is shorter than the predetermined set cycle;

a second nozzle drive cycle replacement device for replacing a predetermined period of the nozzle drive cycle with an optimum cycle between the predetermined set cycle and the measured encoder signal cycle when the encoder signal cycle measured by the encoder signal cycle measuring device changes from a point at which it is shorter than the predetermined set cycle to a point at which it is longer than the predetermined set cycle; and a third nozzle drive cycle replacement device for controlling a timing of a discharge drive of nozzle arrays subordinate to a recording unit downstream in the direction of conveyance depending on an image position recorded by nozzle arrays subordinate to a recording unit upstream in the direction of conveyance of the record medium.

2. The device according to claim 1, wherein the predetermined set cycle is a head drive shortest cycle when data transfer for the recording process cannot be completed to the recording unit, or when a faulty ink discharge occurs in the nozzle array of the recording unit.

3. The device according to claim 1, wherein the optimum cycle is a nozzle drive cycle appropriate for correcting a position of record dots by the nozzle drive cycle replaced with the predetermined set cycle when the measured encoder signal cycle is shorter than the predetermined set cycle.

4. The device according to claim 1, wherein the third nozzle drive cycle replacement device comprises:

a storage device storing the nozzle drive cycle of the image position recorded by the nozzle array subordinate to the recording unit; and a nozzle array control device controlling the discharge drive of the nozzle array subordinate to the recording unit downstream in the direction of conveyance by the nozzle drive cycle stored in the storage device when the image position reaches a discharge position of the nozzle array subordinate to the recording unit downstream in the direction of conveyance.

5. An image recording method for an image recording device having a conveyance mechanism for generating conveyance information about a record medium when the record medium is conveyed after being received upstream from a conveyance path, and a plurality of recording units, each of the plurality of recording units being provided with at least one nozzle array comprising a plurality of nozzles arranged in a direction orthogonal to a direction of conveyance of the record medium, and the plurality of recording units being arranged at predetermined intervals in the direction of conveyance so as to discharge ink by driving the plurality of nozzles of each recording unit, thereby performing a recording process on the record medium, the method comprising:

measuring an encoder signal cycle as the conveyance information about the record medium;

replacing a nozzle drive cycle with a predetermined set cycle when the measured encoder signal cycle is shorter than the predetermined set cycle;

replacing a predetermined period of the nozzle drive cycle with an optimum cycle between the predetermined set cycle and the measured encoder signal cycle when the measured encoder signal cycle changes from a point at which it is shorter than the predetermined set cycle to a point at which it is longer than the predetermined set cycle; and controlling a timing of a discharge drive of nozzle arrays subordinate to a recording unit downstream in the direction of conveyance depending on an image position recorded by nozzle arrays of a recording unit upstream in the direction of conveyance of the record medium.

6. The method according to claim 5, wherein the predetermined set cycle is a head drive shortest cycle when data transfer for the recording process cannot be completed to the recording unit, or when a faulty ink discharge occurs in the nozzle array of the recording unit.

7. The method according to claim 5, wherein the optimum cycle is a nozzle drive cycle appropriate for correcting a position of record dots depending on the nozzle drive cycle replaced with the predetermined set cycle when the measured encoder signal cycle is shorter than the predetermined set cycle.

8. The method according to claim 5, wherein controlling the timing of the discharge drive comprises:

storing the nozzle drive cycle of the image position recorded by the nozzle array subordinate to the recording unit upstream the direction of conveyance of the record medium; and controlling the discharge drive of the nozzle array subordinate to the recording unit downstream in the direction of conveyance by the nozzle drive cycle stored in the storing step when the image position reaches a discharge position of the nozzle array subordinate to the recording unit downstream in the direction of conveyance.

\* \* \* \* \*